United States Patent
Takada (10) Patent No.: US 8,031,230 B2
(45) Date of Patent: Oct. 4, 2011

(54) RECORDED CONTENT DISPLAY PROGRAM AND RECORDED CONTENT DISPLAY APPARATUS

(75) Inventor: Tomomi Takada, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 445 days.

(21) Appl. No.: 12/039,388

(22) Filed: Feb. 28, 2008

(65) Prior Publication Data

US 2008/0211932 A1    Sep. 4, 2008

(30) Foreign Application Priority Data

Mar. 1, 2007    (JP) .................. 2007-051705

(51) Int. Cl.
*H04N 5/232* (2006.01)
*H04N 9/80* (2006.01)

(52) U.S. Cl. ..................... 348/211.3; 386/243

(58) Field of Classification Search ............. 348/211.3, 348/211.8, 211.11, 211.12, 211.13, 152, 348/153; 386/210, 224, 226, 243
See application file for complete search history.

(56) References Cited

U.S. PATENT DOCUMENTS

| | | | | |
|---|---|---|---|---|
| 7,545,434 B2 * | 6/2009 | Bean et al. | ..................... | 348/362 |
| 2002/0093571 A1 * | 7/2002 | Hyodo | ........................ | 348/220 |
| 2004/0244055 A1 | 12/2004 | Takada et al. | | |
| 2005/0076176 A1 | 4/2005 | Takada et al. | | |
| 2006/0171453 A1 * | 8/2006 | Rohlfing et al. | ......... | 375/240.01 |

FOREIGN PATENT DOCUMENTS

| | | |
|---|---|---|
| JP | 2004-355724 | 12/2004 |
| JP | 2005-092679 | 4/2005 |
| JP | 2006333319 | 12/2006 |

OTHER PUBLICATIONS

Japanese Office Action dated Mar. 24, 2009, issued in corresponding Japanese Patent Application No. 2007-051705 along with a partial English language translation.

* cited by examiner

*Primary Examiner* — Sinh Tran
*Assistant Examiner* — Albert Cutler
(74) *Attorney, Agent, or Firm* — Brundidge & Stanger, P.C.

(57) ABSTRACT

Provided are a recorded content display program and a recorded content display apparatus which effectively display the recorded contents of video image recording apparatuses connected in plural. To display the recorded contents of the images when the image recording apparatuses for recording the images taken by a camera are connected in plural, the image retaining ranges for the image recording apparatuses connected in plural are arranged and shown on the one screen with the horizontal axis determined as a time direction. And, the image retaining ranges for the image recording apparatuses are displayed with their displays varied visually depending on a frame rate.

8 Claims, 9 Drawing Sheets

RECORDED CONTENT DISPLAY PROGRAM AND RECORDED CONTENT DISPLAY APPARATUS

INCORPORATION BY REFERENCE

The present application claims priority from Japanese application JP 2007-051705 filed on Mar. 1, 2007 the content of which is hereby incorporated by reference into this application.

BACKGROUND OF THE INVENTION

The present invention relates to a recorded content display program, apparatus and method, and more particularly to a recorded content display program and a recorded content display apparatus and method for effective display of the recorded content of an image recording apparatus.

Figure 1:
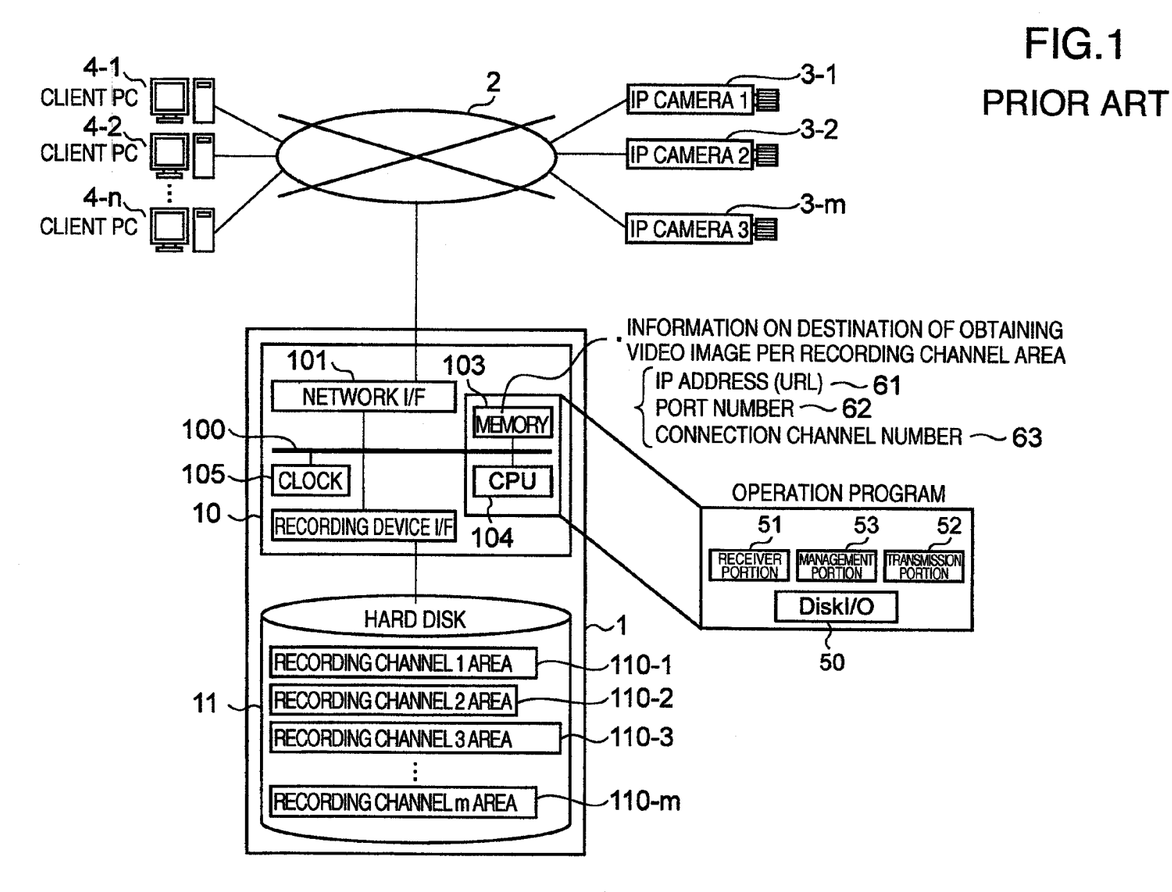
FIG. 1 is a diagram illustrating a system configuration.

FIG. 1 shows component elements of a network digital recorder (NDR). The NDR is a registered trademark of the assignee of the present application.

A network 2 is a computer network which connects plural computers and communicates signals such as control signals and data. Internet protocol (IP) cameras 3 (3-1 to 3-m) are cameras which output the shot video image data to the network. Client PCs 4 (4-1 to 4-n) are common personal computers with a web browser connected through the network.

An NDR 1 is connected to the IP cameras 3 (3-1 to 3-m) and the plural client PCs 4 (4-1 to 4-n), which are used to view the video image data and to set the NDR 1, through the network 2.

The NDR 1 has component elements such as a computer board 10 and a recording device 11. The computer board 10 has thereon connected a network interface (Network I/F) 101, a recording device interface (recording device I/F) 102, a memory 103, a Central Processing Unit (CPU) 104 and a clock 105 through a control bus 100.

The memory 103 has on its part a RAM disk (not shown) which has a file system mounted. The memory 103 stores information necessary for communications with the IP cameras 3. For example, it stores an IP address (URL) 61, a port number 62 and a connection channel number 63 for each camera. It also functions as a recording apparatus by a software program which is stored on the memory 103 and operated by the CPU 104. The operation program has a Disk I/O (Disk Input/Output) portion 50 to perform writing to and reading from the disk, a receiver portion 51 for receiving video image data from the IP cameras 3, a transmission portion 52 for transmitting video image data to the client PCs 4, and a management portion 53 for notifying activation/termination/setting changes of the above three programs.

The recording device 11 has therein camera recording areas 110 in number equivalent to that of the cameras for recording. The camera recording areas (110-1 to 110-m) are areas for recording the video image data from the IP cameras 3.

Roles of individual component elements are described with reference to a flow of video image data.

The IP camera 3 compresses the taken video images one frame at a time by an image compression technique such as JPEG and transmits to the network 2 in an HTTP format and to the NDR 1 in an IP packet format. The video image data sent from the IP camera 3 is transmitted to the network I/F 101 of the NDR 1 through the network 2 in the IP format.

The network I/F 101 converts the received IP format video image data into a format for transmission onto the control bus 100 and delivers the video image data to the receiver portion 51 for software which operates on the CPU 104. The receiver portion 51 takes only the video image data portion from the received HTTP format video image data and transfers the video image data to the Disk I/O portion 50. The Disk I/O portion 50 stores the video image data in the memory 103 to accumulate data of about 10 to 100 frames, calculates the stored position on the recording device 11 and stores in the recording device 11. The accumulated video image data is stored on the camera recording area 110 via the recording device I/F 102.

The video image data of the IP camera 3-1 is stored on the camera recording area 110-1, and the video image data of the IP camera 3-m is stored on the camera recording area 110-m. Thus, the video image data from the IP camera 3 is stored on the corresponding recording area. When recording is performed, information required for the recording operation is stored on the memory 103 of the NDR 1.

A user desiring to watch the video images recorded in the NDR 1 activates NDR reproduction software on the client PC 4. The NDR reproduction software obtains video image data from the NDR 1 and performs displaying and reproduction processing of the video images on the screen of the client PC 4. The NDR reproduction software on the client PC 4 transmits an IP format video image delivery request to the NDR 1 through the network 2. The video image request is made by use of the HTTP. For the video image request parameter, a CGI parameter format is used.

The video image delivery request sent from the client PC 4 is transmitted in the IP format to the network 2 to reach the network I/F 101 of the NDR 1. The network I/F 101 converts the received IP format video image delivery request into a format to transmit onto the control bus 100 and transmits to the transmission portion 52 of software which operates on the CPU 104. The transmission portion 52 analyzes a common gateway interface (CGI) parameter format of the HTTP, confirms that it is a video image request and transmits the video image request to the Disk I/O portion 50. According to the video image delivery request, the Disk I/O portion 50 reads the video image data from the camera recording area 110 via the recording device 102 and sends it back to the transmission portion 52.

The transmission portion 52 gives an HTTP header to the video image data received from the Disk I/O 50 to have an HTTP format and sends the video image data in the IP format from the network I/F 101 to the client PC 4 through the network 2. The NDR reproduction software on the client PC 4 decodes the received video image data and displays on the screen.

Here, the camera recording area 110 is generated before starting to obtain the video images by an NDR 1 setting authorized person from the client PC 4 by using an area securing setting screen. The NDR 1 setting authorized person considers a frame rate and recording time at a time of recording by the connected IP camera 3 to decide a bite size of the camera recording area.

Figure 2:
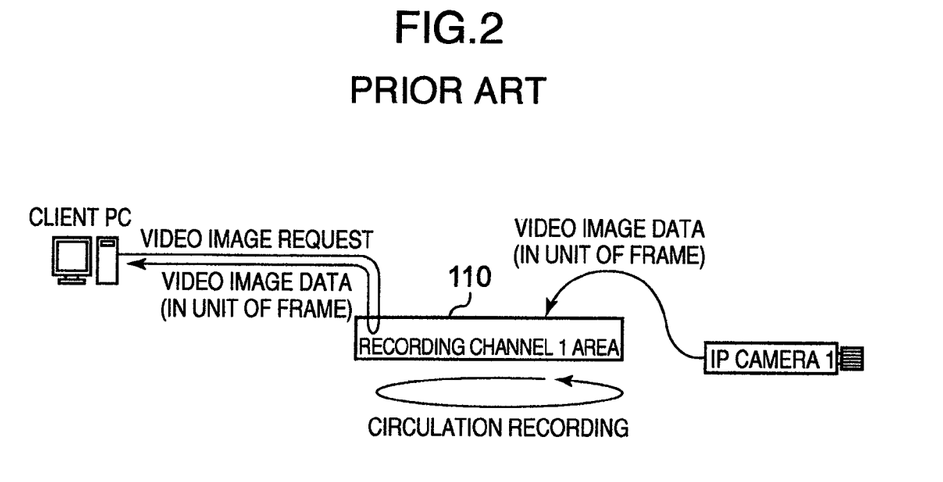
FIG. 2 is a diagram illustrating circulation recording.

As shown in FIG. 2, the video image data is recorded into the camera recording area 110 by starting to record from the head of the area to reach the end, and then overwriting is started again from the head. At the time of video image recording, automatic capacity enhancement is not performed but circulation recording is performed in a previously secured area.

Management numbers (independent sequential numbers starting from 1 for the individual cameras) for individual frames are allotted to the obtained video image data. Such numbers are called "frame numbers". To record the video image data into the recording device 11, video image time and frame number are allotted to the video image data before storing. To obtain one frame of video image data from the client PC 4, the target video image data can be obtained by designating it with reference to the time or frame number. The video image request from the client PC 4 to the NDR 1 is performed in unit of one frame. An instruction is issued in the HTTP format. For details, refer to JP-A-2004-355724 and JP-A-2005-92679.

The client PC 4 is an ordinary personal computer which is operated by a Graphical User Interface (GUI). Reproduction software of the NDR 1 is application software which operates on the client PC 4 connected to the NDR 1 through the network 2.

Figure 3:
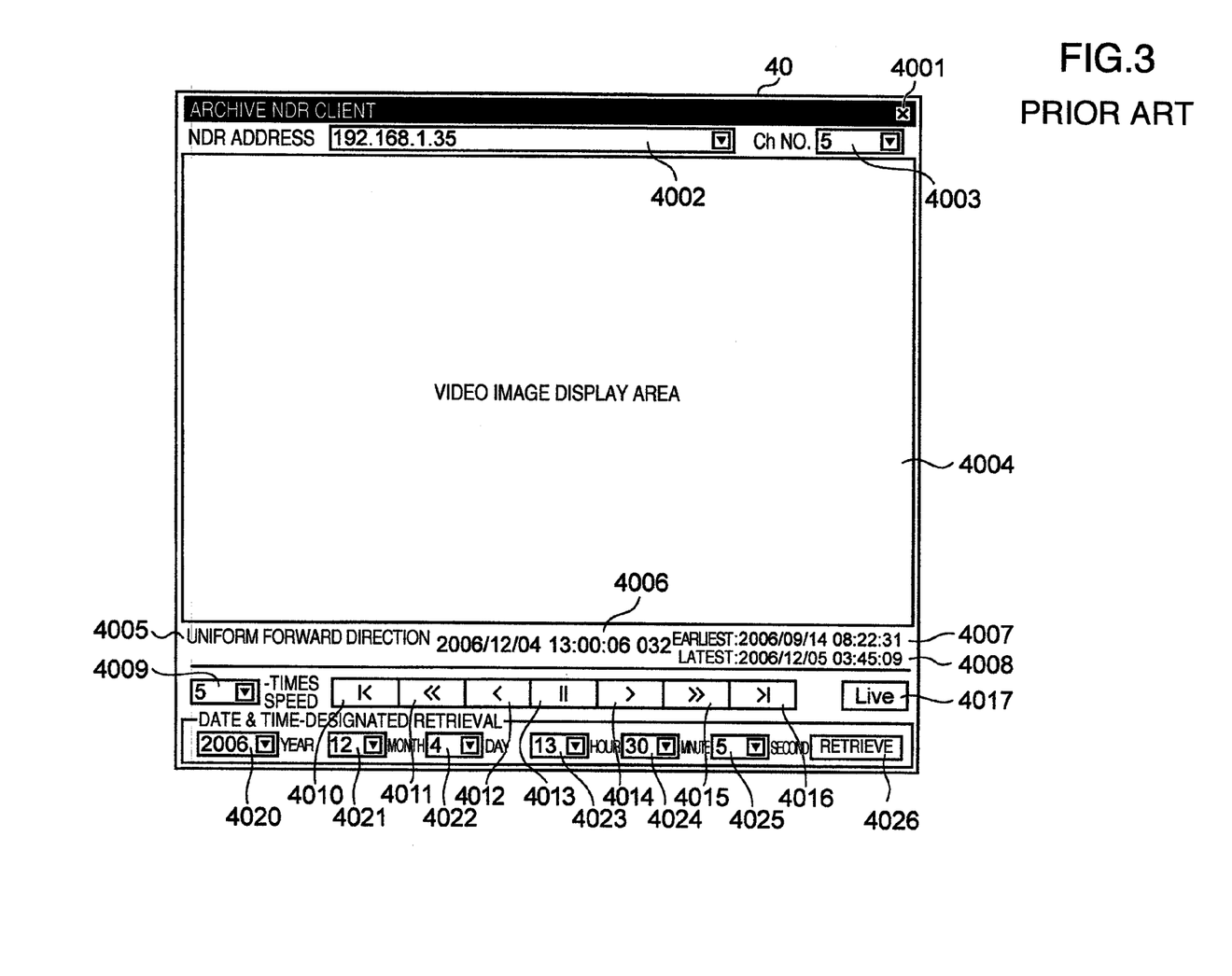
FIG. 3 is a diagram showing an example of a conventional display screen.

FIG. 3 shows a screen (application screen 40) of the reproduction software of the NDR 1.

An end button 4001 is a button to terminate the application software. A connection address input combo box 4002 is an input column for an IP address to designate the NDR 1 to be connected. A channel number input combo box 4003 is an input column for a channel number in the NDR 1 designated by the connection address input combo box 4002. A video image display area 4004 is an area obtained from the NDR 1 and displays extended video image data.

A reproduced state 4005 displays a reproduced state. When a connection to the NDR 1 is successive and video images are being reproduced, the reproduced state 4005 shows reproduced state-indicating character strings "Stop", "Uniform forward reproduction", "Uniform reverse reproduction", "L-time speed forward reproduction", "L-time speed reverse reproduction" (L at the time of fast forward and fast rewinding is an integer, L at the time of slow reproduction is a fraction or a decimal), and "Live". If the connection with the NDR 1 fails, a character string indicating it is displayed.

A video image time 4006 indicates the obtained time, recorded time or image-taking time of video image data shown in the video display area. It shows "year/month/day and hour: minute: second and millisecond" values.

An earliest video image time 4007 indicates the earliest time in the video image data which is held by the channel of the connection destination NDR 1 designated in the box 4002 and the box 4003. A latest video image time 4008 indicates the latest time in the video image data held by the channel of the connection destination NDR 1 designated in the box 4002 and the box 4003.

A reproduction speed designation combo box 4009 designates the video reproduction speed.

When an earliest point shifting button 4010 is depressed, the earliest video image data of the channel of the connection destination NDR 1 designated in the boxes 4002 and 4003 is shown. When a reverse designated speed reproduction button 4011 is depressed, reverse reproduction is performed at the speed designated in the box 4009. When a reverse uniform reproduction button 4012 is depressed, reverse uniform reproduction is performed (the same operation as when a one-time speed is designated in the box 4009 and the button 4011 is depressed). When a pause button 4013 is depressed, the video image reproduction is paused. When a uniform forward reproduction button 4014 is depressed, the uniform forward reproduction is performed (the same operation as when the one-time speed is designated in the box 4009 and a forward designated speed reproduction button 4015 is depressed). When the forward designated speed reproduction button 4015 is depressed, the forward reproduction is performed at the speed designated in the box 4009. When a latest point shifting button 4016 is depressed, the latest video image data of the channel of the connection destination NDR 1 designated in the boxes 4002 and 4003 is displayed.

When a Live reproduction button 4017 is depressed, the latest video image of the connection destination NDR 1 designated in the boxes 4002 and 4003 is reproduced.

Year, month, day, hour, minute and second are designated by time designation combo boxes 4020 to 4025, and a retrieval execution button 4026 is depressed to show the video image data of the designated time.

SUMMARY OF THE INVENTION

Here, as an NDR operation method, an operation method with plural NDRs connected is also taken into consideration. But, conventionally, there was a problem that a specific operation method with plural NDRs connected had not been considered substantially.

Under the circumstances described above, the present invention provides a recorded content display program and a recorded content display apparatus and method to effectively display the recorded contents of the NDRs.

The present invention has been made in view of the above circumstances, and the recorded content display program according to the invention is a program stored on a computer-readable storage medium executed by a computer of a recorded content display apparatus which displays recorded content of image wherein a plurality of image recording apparatuses is connected to store the image (also called video images) taken by a camera, comprising a function which arranges display positions, with regard to a horizontal direction determined as a time direction, of information about the image wherein the display positions are in image retaining ranges for the image recording apparatuses, and a function which shows, on one display screen, the image retaining ranges for the image recording apparatuses wherein the image retaining ranges are arranged at predetermined intervals in a vertical direction.

Besides, the recorded content display program according to the invention is configured to display the image retaining ranges for the image recording apparatuses with visually different indications varied depending on a frame rate.

The recorded content display program according to the invention is configured to show, if there is a predetermined time interval or more between the recorded date and time, obtained date and time or image-taken date and time of the image being reproduced and the recorded date and time, obtained date and timed or image-taken date and time of the image to be reproduced next when the recorded images for the image recording apparatuses connected in plural are being reproduced, skipping of that time interval and also the recorded date and time, obtained date and time or image-taken date and time of the image being reproduced, and the recorded date and time, obtained date and time or image-taken date and time of the image to be reproduced next on the one screen for a predetermined time period.

To achieve the above object, the recorded content display apparatus according to the invention is a recorded content display apparatus for displaying recorded contents of image wherein a plurality of image recording apparatuses is connected to store the image taken by a camera, comprising a display portion which arranges display positions, with regard to a horizontal direction determined as a time direction, of information about the image wherein the display positions are in image retaining ranges for the image recording apparatuses and shows, on one display screen, the image retaining ranges for the image recording apparatuses wherein the image retaining ranges are arranged at predetermined intervals in a vertical direction.

The recorded content display apparatus according to the invention is configured to display the image retaining ranges for the image recording apparatuses with their indications (for example, colors and patterns) varied depending on a frame rate.

The recorded content display apparatus according to the invention is configured to show, if there is a predetermined time interval or more between the recorded date and time, obtained date and time or image-taken date and time of the image being reproduced and the recorded date and time, obtained date and time or image-taken date and time of the image to be reproduced next when the recorded images of the image recording apparatuses connected in plural are being reproduced, skipping of that time interval and also the recorded date and time, obtained date and time or image-taken date and time of the image being reproduced, and the recorded date and time, obtained date and time or image-taken date and time of the image to be reproduced next on the one screen for a predetermined time period.

As described above, the recorded contents of the NDRs can be displayed effectively by the recorded content display program and the recorded content display apparatus and method according to the present invention.

Other objects, features and advantages of the invention will become apparent from the following description of the embodiments of the invention taken in conjunction with the accompanying drawings.

DETAILED DESCRIPTION OF THE EMBODIMENTS

Embodiments of the invention are described below with reference to the drawings. The invention relates to a video display screen in a case where plural NDRs are connected and a recording time period is being extended.

The operation to transfer video image data with the plural NDRs connected is described with reference to FIG. 4.

An NDR-A obtains video image data from the IP camera 3 and stores it in a recording area or a recording channel on a recording device 55A of the NDR-A. A camera receiver portion 51A obtains HTTP data (including video image data) in a Hypertext Transfer Protocol (HTTP) format from the IP camera 3, extracts a video image data portion from the obtained HTTP data and transfers the extracted video image data to a Disk I/O portion 50A. The Disk I/O portion 50A stores the video image data in the pertinent recording channel on the recording device 55A.

An NDR-B obtains the video image data from the NDR-A and stores it in a recording area or a recording channel on a recording device 55B of the NDR-B. An inter NDR communication receiver portion 54B issues a video image request to an NDR type transmission portion 53A.

Upon receiving the HTTP format video request, the NDR type transmission portion 53A obtains the requested video image data via the Disk I/O portion 50A and sends back the HTTP data (including video image data) in the HTTP format to the inter NDR communication receiver portion 54B. The inter NDR communication receiver portion 54B extracts the video image data portion from the received HTTP format HTTP data (including the video image data) and transfers the extracted video image data to a Disk I/O portion 50B. The Disk I/O portion 50B stores the video image data in the pertinent recording channel on the recording device 55B.

An NDR-C obtains the video image data from the NDR-B and stores it in the recording area on a recording device 55C of the NDR-C. The processed content of the NDR-C is the same as that when the NDR-B obtains the video image data from the NDR-A (see 53B, 54C, 50C, 53C).

The video image request from the client PC 4 to the NDR is performed in unit of one frame. The client PC 4 issues an instruction in the HTTP format. For designation of the video image data, time information is used.

Figure 4:
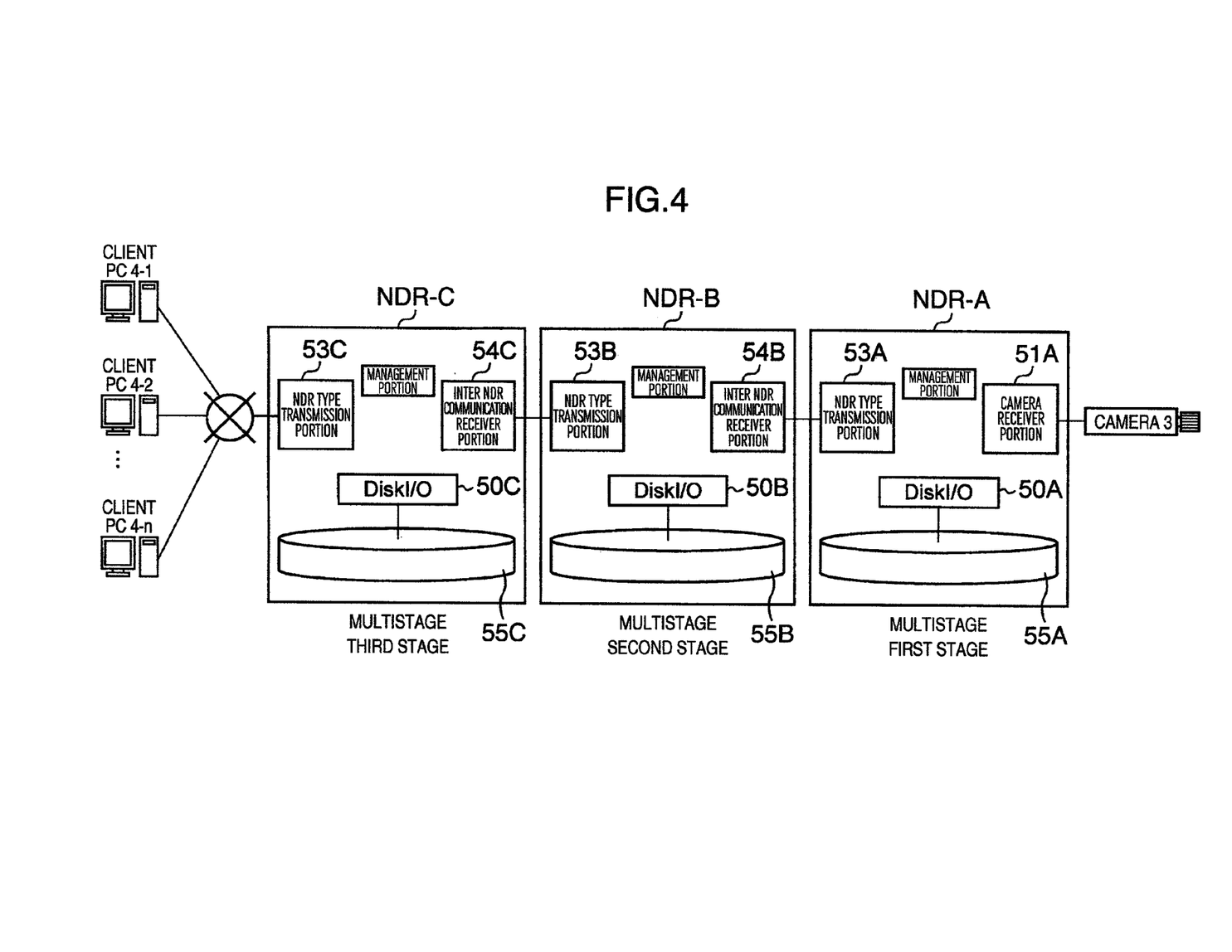
FIG. 4 is a diagram showing an example of connecting the NDRs according to an embodiment of the invention.

FIG. 4 is an example of simplified description, wherein the NDR-B obtains the video image data from the NDR-A only, and the NDR-C obtains the video image data from the NDR-B only. As another embodiment, for example, in a certain recording channel of the NDR-C, the NDR-C obtains and stores the video image data from the NDR-B but, in another recording channel of the NDR-C, obtains and stores the video image data from the NDR-A, and in still another recording channel of the NDR-C, obtains and stores the video image data from the IP camera 3. Thus, the destination from which the video image data is obtained might be different for the individual camera areas. In FIG. 4, the three NDRs are connected in series, but as another embodiment, they may be connected through a common interface or a common network by use of a communication portion having a function of the inter NDR communication receiver portion and a function of the NDR type transmission portion. And, any NDR may be connected through a wireless line. The video image data transmission method may adopt a data format other than the HTTP format.

For ease of explanation, it is determined that when the video image data is transmitted through the multistage NDRs, the video image data is transmitted to the recording channels having the same number. The video image information in the recording channel 1 of the NDR-A is moved to the recording channel 1 of the NDR-B, and further to the recording channel 1 of the NDR-C.

The above description is merely an example, and real connection can be set to flow video images from a recording channel having any number of the upstream NDRs to a recording channel having any number of the downstream NDRs.

Figure 5:
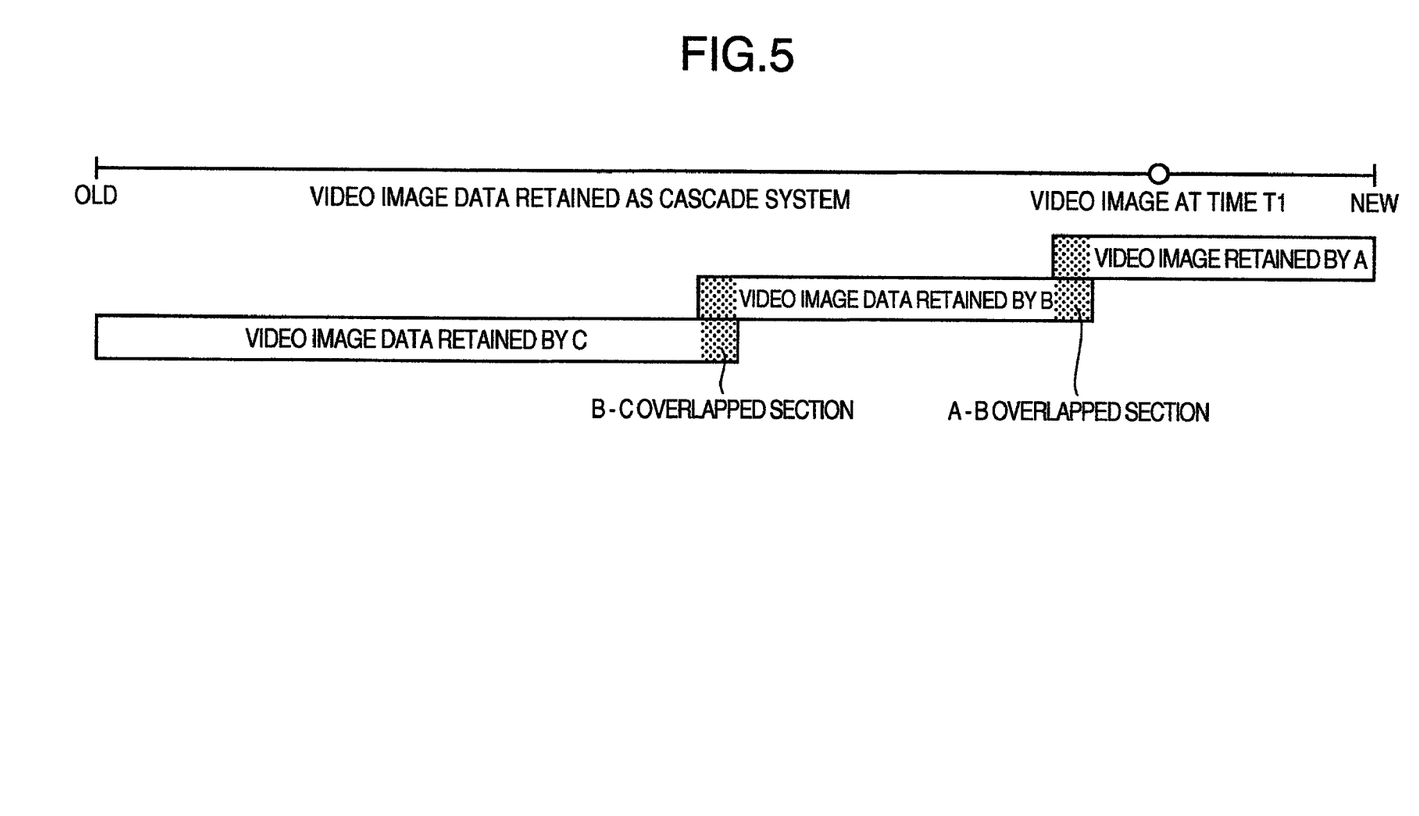
FIG. 5 is a diagram showing an image retaining range according to an embodiment of the invention.

FIG. 5 shows a time relationship (image retaining range) of the stored video image data of the individual NDRs of FIG. 4. The video image data which has become old in the NDR-A is obtained and stored by the NDR-B. The video image data which has become old in the NDR-B is obtained and stored by the NDR-C.

Here, to prevent the old video image data in the NDR-A from being erased by overwriting before it is obtained by the NDR-B, a section in which the same video image data is possessed by the two NDRs, namely a section in which the video image data are overlapped, is disposed between the NDR-A and the NDR-B. The same is also applied between the NDR-B and the NDR-C.

Thus, the multistage connection of the NDRs can extend a total recording time.

Accordingly, it is significant to provide a mechanism that it is apparent from which NDR the video images being displayed are derived when the video images are reproduced from the multistage connected NDRs. The frame rate of the video image data stored on the NDRs is not always constant at all times but varied depending on a day of the week or a time zone. There may be an operation to record for only a predetermined time when a trigger is received externally by alarm recording. And, when the NDRs are connected in multiple stages, the video image data with the number of frames or the like reduced from the video image data stored on an upstream NDR may be obtained or only the video images in a particular time zone may be obtained. Accordingly, a display portion or a display technique to make a section of video images retained by the individual NDRs and a frame rate on the video image section at a given time visible at first sight is required.

During the video image reproduction, if a video image time is dispersed for a predetermined time or more and an angle of view and brightness of the image-taken video images do not change, a viewer might not notice that the video images have been changed to those recorded at another time. Therefore, a display portion or a display technique making it possible to instantly notice that the video images are recorded at another time is also required.

Therefore, the present invention shows the image retaining section of the each of the multistage NDRs on the application screen of the client PC as shown in FIG. 5. And, a frame rate of video image data which is retained by the individual NDRs at individual times is indicated by a different color. If the time of the reproduced video image has a predetermined time interval or more, the application screen shows a screen indicating that effect for a predetermined period. Details are described below.

Figure 6:
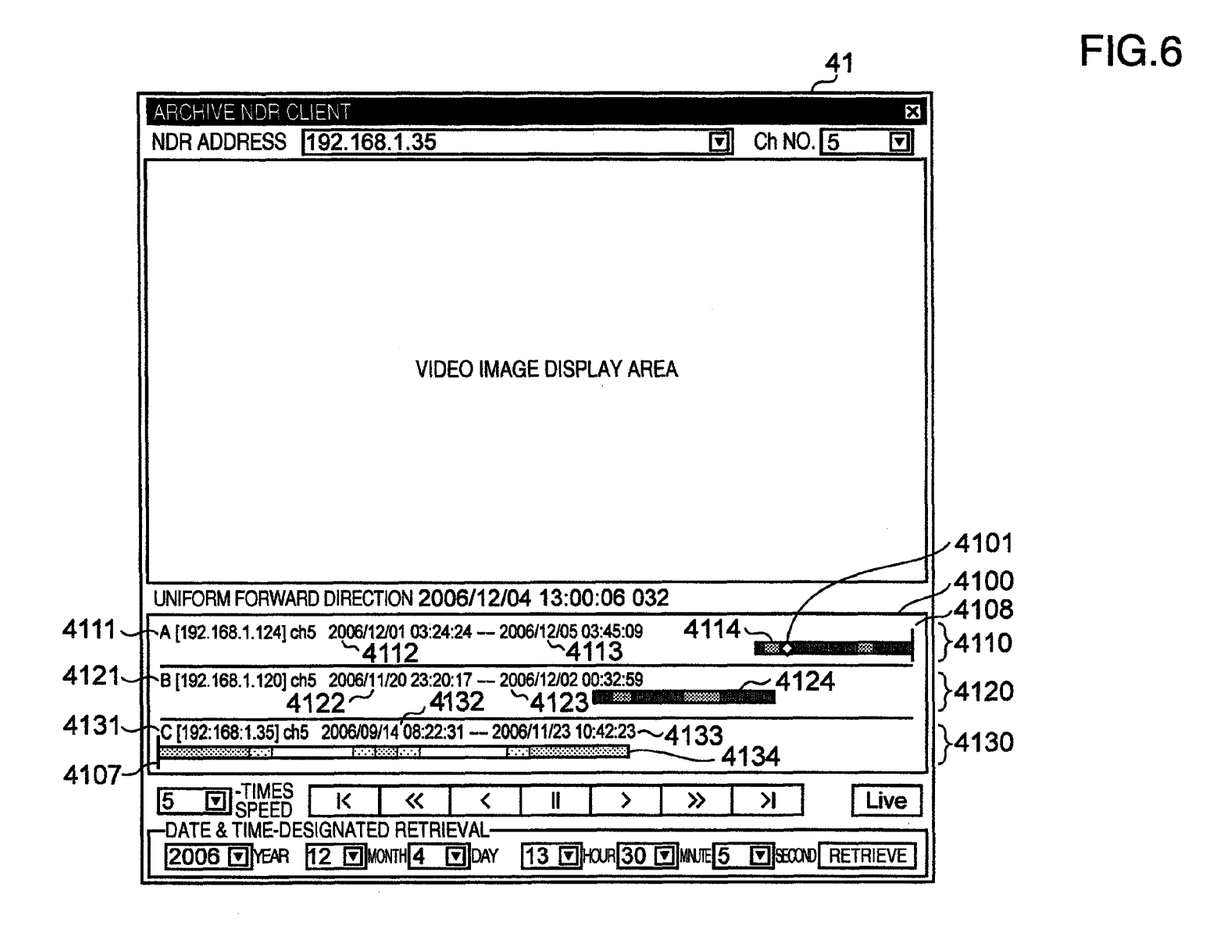
FIG. 6 is a diagram showing a display screen according to an embodiment of the invention.

FIG. 6 shows an application screen 41 with addition of a display column for the image retaining section of each NDR. It shows a structure that the earliest video image time 4007 and the latest video image time 4008 are eliminated from the application screen 40 (FIG. 3), and an image retaining section column 4100 is added.

In this embodiment, the multistage NDR connection structure is an example of FIG. 4, and the relationship of the image retaining sections of the individual NDRs is determined to be in the state of FIG. 5 for description. As an example of the description, it is assumed that the video image data is reduced when the video image is shifted to the downstream NDR.

The image retaining section column 4100 is divided into the columns of individual NDRs and NDR image retaining information columns (4110 to 4130). The application screen 41 shows information of the image retaining section of an upstream (close to the IP camera 3) NDR of FIG. 4 at an upper stage of the display column and of a downstream (close to the client PC 4) NDR of FIG. 4 at a lower stage of the display column.

In this embodiment, the application screen 41 shows the retaining section information of the NDR-A in the NDR image retaining information column 4110, the retaining section information of the NDR-B in the NDR image retaining information column 4120, and the retaining section information of the NDR-C in the NDR image retaining information column 4130.

Identification name display columns 4111, 4121, 4131 show NDR names, IP addresses and channel names. In-NDR earliest times 4112, 4122, 4132 show the earliest time of the video images retained in the individual NDRs. In-NDR latest time 4113, 4123, 4133 show the latest time of the video images retained in the individual NDRs.

A video image position marker 4101 is a marker indicating from which NDR obtained the video image being shown in the video image display area 4004 and from which part of the image retaining section of the NDR.

The image retaining section column 4100 shows a left end 4107 as the earliest video image time under multistage connection, a right end 4108 as the latest video image time under multistage connection, and the retaining video image sections of the individual NDRs as image retaining sections 4114, 4124, 4134. As shown in FIG. 6, the image retaining sections 4114, 4124, 4134 are arranged and shown in the vertical direction with predetermined intervals provided considering to make it easy for the user to recognize that the individual NDRs have sections where the video images are retained in an overlapped state, and the plural NDRs have the video images of the same IP camera recorded in a dispersed state.

The left end of the image retaining section 4114 is a position indicating the in-NDR earliest time 4112, and the right end of the same 4114 is a position indicating the in-NDR latest time 4113. Similarly, the left end of the image retaining section 4124 is a position indicating the in-NDR earliest time 4122, the right end is a position indicating the NDR latest time 4123, the left end of the image retaining section 4134 is a position indicating the in-NDR earliest time 4132, and the right end is a position indicating the in-NDR latest time 4133.

Display colors in the image retaining sections 4114, 4124, 4134 indicate whether the frame rate is high or low. In this embodiment, a deeper (darker) color indicates a higher frame rate, a lighter (brighter) color indicates a lower frame rate, and a portion same as the background color indicates a section where no video image is recorded. In this embodiment, since reduction is performed when the video image is moved to the downstream NDR, a further downstream side NDR has the image retaining section which has therein light colors indicating a low frame rate increased in number. In this embodiment, the image retaining section uses plural colors to indicate whether the frame rate is high or low, but as another embodiment, the image retaining section may use plural patterns and codes to indicate whether the frame rate is high or low.

In this embodiment, drawing pixels in the horizontal direction between the left end 4107 and the right end 4108 are 640 pixels. The image retaining sections 4114, 4124 and 4134 are drawn by mapping with the left end 4107 determined as the earliest time, the right end 4108 determined as the latest time, and the pertinent section determined as 640 pixels.

For convenience of explanation, it is assumed that the NDR-A retains video images in volume such that the image retaining section 4114 of the NDR-A comes to have a width of 150 pixels. Similarly, it is assumed that the image retaining section 4124 of the NDR-B retains video images with a width of 200 pixels and the image retaining section 4134 of the NDR-C retains video images with a width of 400 pixels. The image retaining sections 4114, 4124, 4134 have a section with overlapped video image data, so that a total width of all image retaining sections becomes longer than 640 pixels. Additionally, a procedure that reproducing application software of the client PC obtains frame rate information to draw from the individual NDRs into the image retaining sections 4114, 4124 and 4134 is described with reference to FIG. 7.

Figure 7:
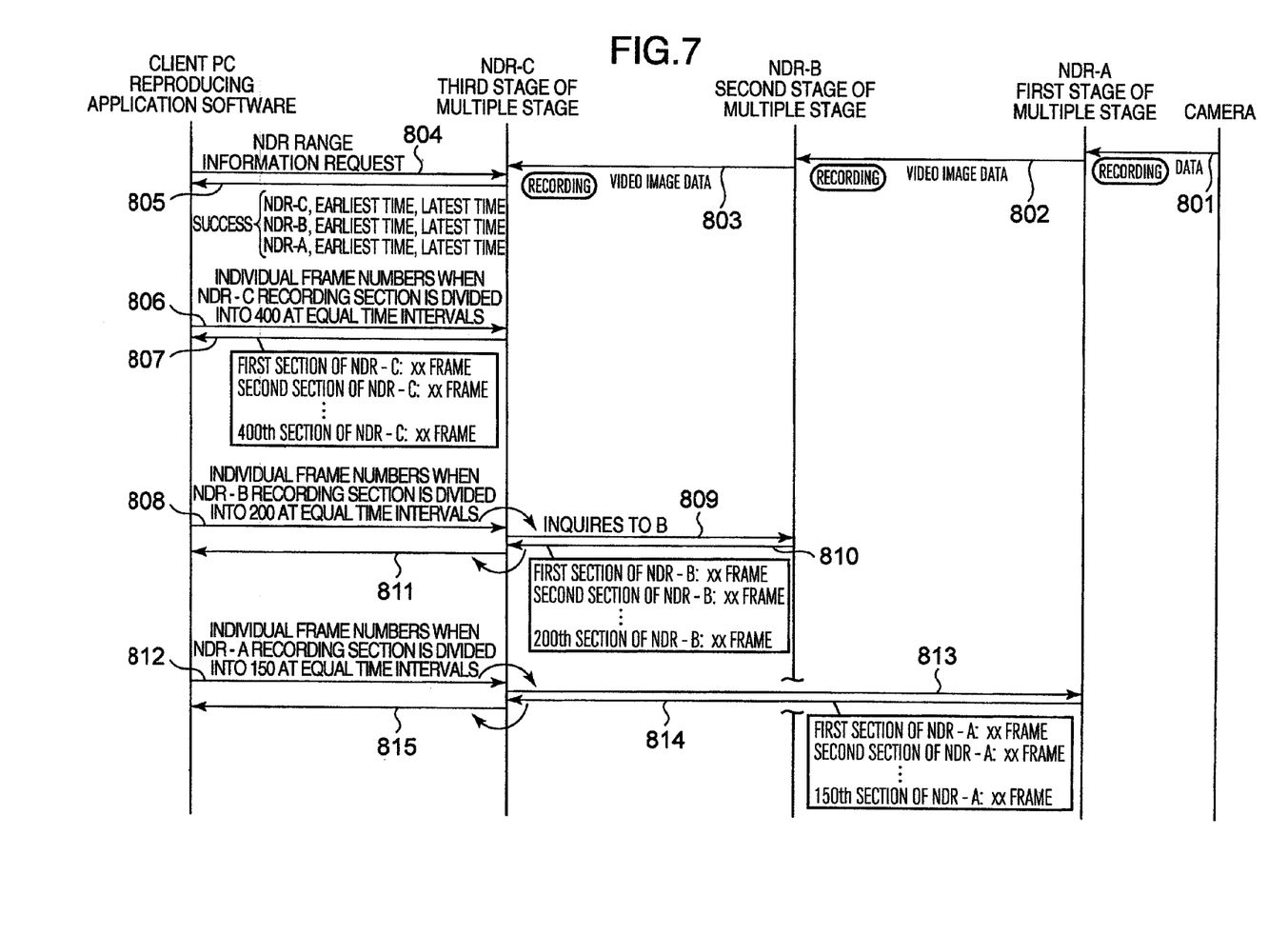
FIG. 7 is a diagram showing a processing flow according to an embodiment of the invention.

In step 801, the NDR-A in FIG. 4 obtains video images by transmission from the IP camera 3 and records the video images in the recording apparatus within the NDR-A.

In step 802, the NDR-B obtains video images, which have become old in the NDR-A, by transmission from the NDR-A and records the video images in the recording apparatus within the NDR-B. At the time of the video transmission, information of the image retaining range (the earliest time and the latest time) of the NDR-A is also transmitted at the same time, and the NDR-B retains the range information of the NDR-A.

In step 803, the NDR-C obtains video images, which have become old in the NDR-B, by transmission from the NDR-B and records the video images in the recording apparatus within the NDR-C. At the time of the video image transmission, information on the image retaining ranges of the NDR-A and the NDR-B is also transmitted, and the NDR-C retains the range information of the NDR-A and the NDR-B.

Steps 801, 802 and 803 are constantly performed, and video image data of the camera is kept flowing from the upstream NDR to the downstream NDR.

In step 804, reproducing application software makes an "NDR video range information request" to the NDR-C.

In step 805, the reproducing application software sends back the video range information (the earliest time and the latest time) of the NDR-C, NDR-B and NDR-A as a response to step 804 by the NDR-C.

The reproducing application software calculates the widths of the image retaining sections 4114, 4124 and 4134 and the number of display pixels according to the range information of the individual NDRs obtained in step 805 when displaying in the image retaining section column 4100.

In step 806, the reproducing application software requests the NDR-C for a value of "the number of individual frames when the image retaining section of the NDR-C is divided into 400" in order to calculate the display colors of the individual pixels in 400 pixels of the image retaining section 4134.

In step 807, the NDR-C sends back the individual frame numbers when the image retaining section of the NDR-C is divided into 400. In other words, the NDR-C sends back 400 numerical values ranging from the first to 400th sections and the number of frames of the individual sections.

The reproducing application software divides the time subtraction between the left end 4107 and the right end 4108 by 640 to calculate a time per pixel.

And, the reproducing application software determines an average frame rate in one pixel from the number of frames of the individual sections (obtained in step 807) and the time corresponding to one pixel. The reproducing application software calculates the display colors of the individual pixels of the image retaining section 4134 according to the calculated frame rate value and draws the image retaining section 4134.

In step 808, to calculate the display colors of the individual pixels in 200 pixels of the image retaining section 4124, the reproducing application software requests the NDR-C for a value of "the number of individual frames when the image retaining section of the NDR-B is divided into 200".

In step 809, the NDR-C requests the NDR-B for a value of "the number of individual frames when the image retaining section of the NDR-B is divided into 200".

In step 810, the NDR-B sends back the number of individual frames when the image retaining section of the NDR-B is divided into 200. In other words, the NDR-B sends back 200 numerical values ranging from the first to 200th sections and the number of frames of the individual sections.

In step 811, the NDR-C transfers the return data from the NDR-B to the reproducing application software.

As another embodiment of the steps 808 to 811, the reproducing application software does not obtain information about the frames of all sections of the NDR-A and the NDR-B at one time but may make an inquiry only when information about a necessary section is required. For example, when the frame including video image data is transmitted from the NDR-A to the NDR-B, the reproducing application software may obtain information about the transmitted frame.

And, the reproducing application software calculates an average frame rate in one pixel from the number of frames of the individual sections (obtained in step 811) and the time corresponding to one pixel. The reproducing application software calculates the display colors of the individual pixels of the image retaining section 4124 according to the calculated frame rate value and draws the image retaining section 4124.

In step 812, to calculate the display colors of the individual pixels in 150 pixels of the image retaining section 4114, the reproducing application software requests the NDR-C for a value of "the number of individual frames when the image retaining section of the NDR-A is divided into 150".

In step 813, the NDR-C requests the NDR-A for a value of "the number of individual frames when the image retaining section of the NDR-A is divided into 150".

In step 814, the NDR-A sends back the number of individual frames when the image retaining section of the NDR-A is divided into 150. In other words, the NDR-A sends back 150 numerical values ranging from the first to 150th sections and the number of frames of the individual sections.

In step 815, the NDR-C transfers the return data from the NDR-B to the reproducing application software.

And, the reproducing application software calculates an average frame rate in one pixel from the number of frames of the individual sections (obtained in step 815) and the time corresponding to one pixel. The reproducing application software calculates the display colors of the individual pixels of the image retaining section 4114 according to the calculated frame rate value and draws the image retaining section 4114.

The reproducing application software makes a video image request for each frame when the video image is reproduced. The NDR reads the requested video image data from the recording apparatus and transmits to the reproducing application software.

The IP camera to be connected to the NDR is mainly used as a monitoring camera. When it is used as the monitoring camera and especially used to monitor indoors, even if an angle of view and brightness of the camera are poorly changed and the recorded video images of the NDR are skipped temporally, a person watching the recorded video images of the NDR by the reproducing application software might not notice that the reproduction video images are skipped temporally.

Figure 8:
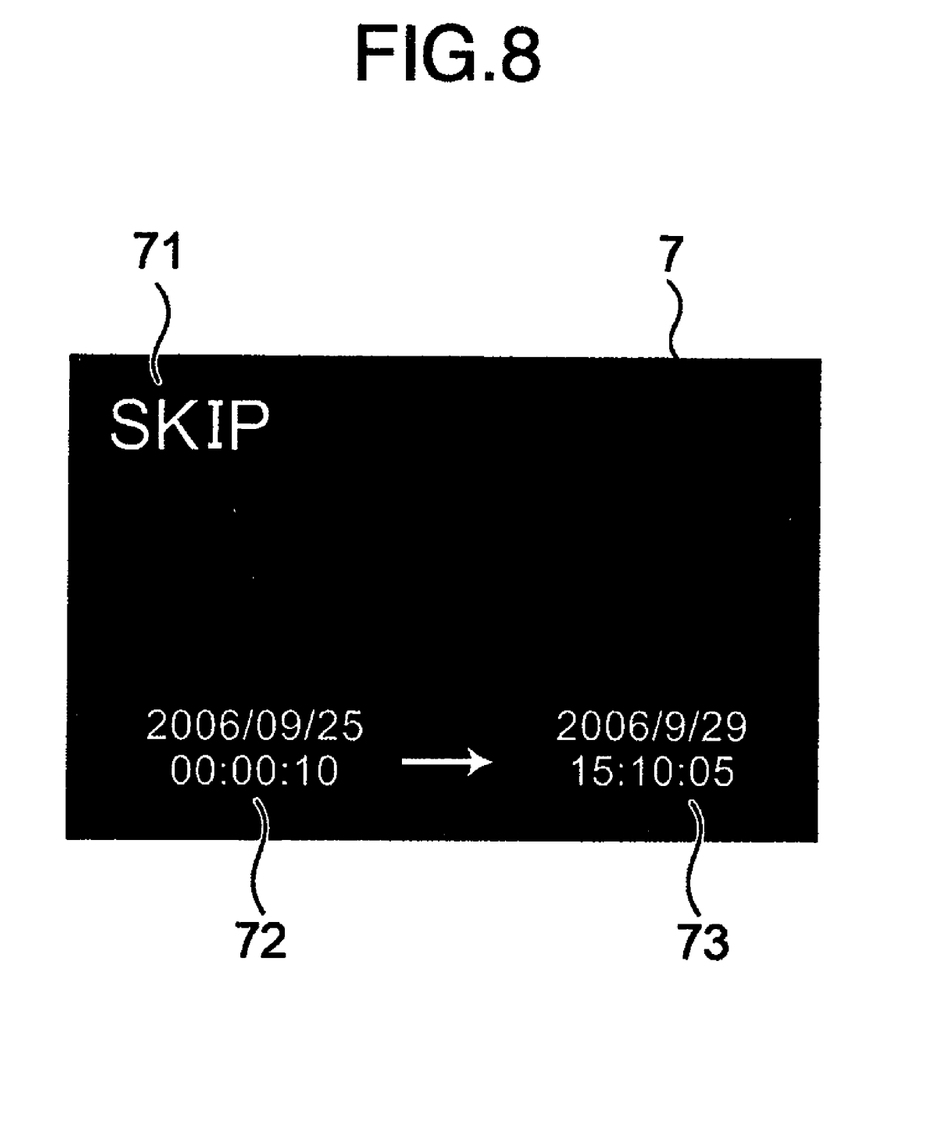
FIG. 8 is a diagram showing a display screen according to an embodiment of the invention.

Therefore, in this embodiment, if the display video images (a difference between the time of the video image data being displayed and the time of the video image data to be displayed next) have a vacancy for three minutes or more in a forward/reverse direction at a speed of 30 times or less, a screen 7 exemplified in FIG. 8 is displayed for 0.5 second. 71 indicates "SKIP" to show what is meant on the screen. In other words, it is indicated to skip the vacant time. 72 indicates a time before the video image time is skipped. 73 indicates a time after the video image time was skipped.

In this embodiment, the display conditions on the screen 7 shown in FIG. 8 are determined that the speed upper limit is 30 times, the display time interval is three minutes, and the display time is 0.5 second, but these three values are changeable setting values of the reproducing application software and can be varied depending on the usage.

Figure 9:
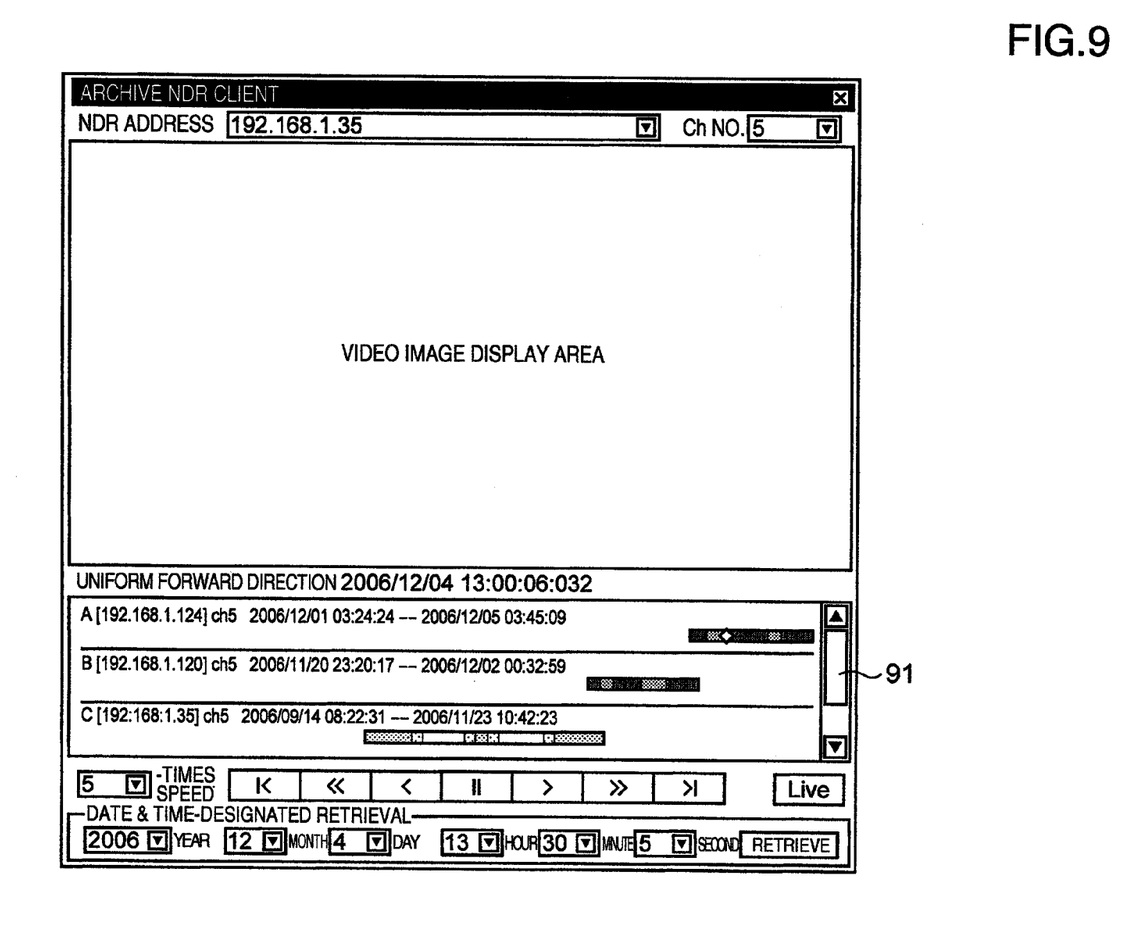
FIG. 9 is a diagram showing a display screen according to an embodiment of the invention.

In this embodiment, the described number of stages of the NDRs is three but, if the number of stages of the NDRs is four or more, the display number of stages of the image retaining section column 4100 may be increased to the number of stages of the NDRs, or as shown in FIG. 9, a scroll bar 91 may be provided in the image retaining section column 4100 such that the image retaining section column 4100 is scrolled.

Here, the recorded content display apparatus of the present invention is not necessarily limited to the above-described structure but may have various structures. And, the present invention can be provided as, for example, a method or mode to perform the processing according to the invention, a program for realizing the above method or mode or a storage medium for recording the program, and can also be provided as various devices and systems.

The field of applying the present invention is not limited to what was described above, and the invention can be applied to various fields.

As various processes performed by the recorded content display apparatus and the like of the present invention, for example, a hardware resource provided with a processor, memory and the like may have a structure to control when the processor executes the control program stored on a ROM (Read Only Memory), and for example, it may be configured as a hardware circuit in which individual functional portions for executing the pertinent processes are independent of each other.

The present invention can also recognize as a computer-readable storage medium such as a floppy (registered trademark) disk or a CD (Compact Disc)-ROM which stores the above-described control program or the pertinent program (itself), and can perform the processing according to the invention by inputting the control program from the storage medium into the computer to cause the processor to execute it.

It should be further understood by those skilled in the art that although the foregoing description has been made on embodiments of the invention, the invention is not limited thereto and various changes and modification may be made without departing from the spirit of the invention and the scope of the appended claims.

The invention claimed is:

1. A program stored on a computer-readable storage medium executed by a computer of a recorded content display apparatus which displays recorded video images, wherein a plurality of image recording apparatuses are connected through a network to store dispersedly the videos images taken by a camera, comprising:
   a function which requests and obtains, from one of the plurality of image recording apparatuses, information regarding image retaining ranges of the plurality of image recording apparatuses, the information regarding the image retaining ranges corresponding to video images taken by a same camera, and containing an earliest time and a latest time for each respective image retaining range;
   a function which calculates display positions of indications of the image retaining ranges respectively,
   wherein the display positions are arranged in a time axis in a horizontal direction; and
   a function which shows, on a display screen, the indications regarding the same camera for each of the image recording apparatuses,
   wherein the indications are arranged at predetermined intervals in a vertical direction, and
   wherein the indications are drawn in different colors or patterns that are varied depending on a frame rate.

2. The program according to claim 1,
   wherein each of the image recording apparatuses performs circulation recording, the plurality of image recording apparatuses are connected in multiple stages and constitute a cascade system such that a first image recording apparatus on a downstream side of the cascade system obtains and stores video images transferred from a second image recording apparatus on an upstream side of the cascade system before the data of the image is deleted from the second image recording apparatus,
   wherein frame numbers of the data of the images are reduced when the video images are obtained, and
   wherein the program further comprises:
      a function which displays the image retaining ranges for each of the image recording apparatuses with visually different indications varied depending on a frame rate of the video images, and
      a function which displays a marker on one of the indications, the position of the marker indicating a time and which of the image recording apparatuses obtained the video image being shown in the display screen.

3. The program according to claim 2, further comprising:
   a function, which when there is a predetermined time interval or more between a recorded date and time, obtained date and time or image-taken date and time of the image being reproduced, and the recorded date and time, obtained date and time or image-taken date and time of the image to be reproduced next, when the recorded images for the image recording apparatuses connected in plural are being reproduced, shows on the display screen for a predetermined time period:
   an indicator of skipping of the predetermined time interval;
   the recorded date and time, obtained date and time or image-taken date and time of the image being reproduced; and
   the recorded date and time, obtained date and time or image-taken date and time of the image to be reproduced next.

4. The program according to claim 2, further comprising:
   a function which obtains a time range of video image data recorded in the plural image recording apparatuses;
   a function which retrieves two images corresponding to an earliest video image data in all video image data and a latest video image data in all video image data recorded in the plural image display apparatuses; and
   a function which calculates a time difference between the earliest video image data and the latest video image data and a time per pixel whereby the time range can be displayed on the time axis, calculates the number of frames for individual pixels in a horizontal direction of the indications and calculates colors of the indications based on the number of frames for each image recording apparatus and each pixel.

5. The program according to claim 1, further comprising:
   a function which displays a video image position marker in the image retaining range, wherein the video image position marker indicates from which image display apparatus the video image being displayed is obtained and/or from which part in the image retaining range for the image recording apparatus the video image is obtained.

6. A recorded content display apparatus which displays recorded video images, wherein a plurality of image recording apparatuses are connected through a network to store dispersedly the video images taken by a camera, comprising:
   a receiver portion which requests and obtains, from one of the plurality of image recording apparatuses, information regarding image retaining ranges of the plurality of image recording apparatuses, the information regarding the image retaining ranges corresponding to video images taken by a same camera, and containing an earliest time and a latest time for each respective image retaining range;

a display portion which calculates display positions of indications of the image retaining ranges respectively, wherein the display positions are arranged in a time axis in a horizontal direction and shows, on a display screen, the indications regarding the same camera for each of the image recording apparatuses, wherein the indications are arranged at predetermined intervals in a vertical direction, and wherein the indications are drawn in different colors or patterns that are varied depending on a frame rate.

7. The recorded content display apparatus according to claim 6, wherein each of the image recording apparatuses performs circulation recording, the plurality of image recording apparatuses are connected in multiple stages and constitute a cascade system such that a first image recording apparatus on a downstream side of the cascade system obtains and stores video images transferred from a second image recording apparatus on an upstream side of the cascade system before the data of the image is deleted from the second image recording apparatus, wherein frame numbers of the data of the image are reduced when video images is obtained, wherein the image retaining ranges for each of the image recording apparatuses with visually different indications, varied depending on a frame rate of the video images, are displayed, and wherein a marker on one of the indications, the position of the marker indicating a time and which of the image recording apparatuses obtained the video image being shown in the display screen, is displayed.

8. The recorded content display apparatus according to claim 7, wherein the display portion, when there is a predetermined time interval or more between a recorded date and time, obtained date and time or image-taken date and time of the image being reproduced, and the recorded date and time, obtained date and time or image-taken date and time of the image to be reproduced next, when the recorded images of the image recording apparatuses connected in plural are being reproduced, shows on the display screen for a predetermined time period:

an indicator of skipping of the predetermined time interval;

the recorded date and time, obtained date and time or image-taken date and time of the image being reproduced; and the recorded date and time, obtained date and time or image-taken date and time of the image to be reproduced next.

* * * * *